United States Patent [19]

Toyoda et al.

[11] 4,420,530

[45] Dec. 13, 1983

[54] COATING AGENTS AND THERMOPLASTIC RESIN FILMS COATED THEREWITH

[75] Inventors: Takashi Toyoda; Yozo Ohba; Masaaki Yamanaka, all of Omigawa; Kanji Shirai, Hazaki, all of Japan

[73] Assignee: Oji Yuka Goseishi Kabushiki Kaisha, Tokyo, Japan

[21] Appl. No.: 356,149

[22] Filed: Mar. 8, 1982

[30] Foreign Application Priority Data

Mar. 12, 1981 [JP] Japan ................................. 56-34568

[51] Int. Cl.³ .................... B32B 5/16; B32B 27/32
[52] U.S. Cl. .................................. 428/323; 156/229; 156/282; 428/341; 428/409; 428/474.4; 428/476.3; 428/476.9; 428/516; 428/523; 428/537; 428/910
[58] Field of Search .............. 428/474.4, 340, 409, 428/523, 516, 341, 537, 476.3, 476.9, 323; 156/229, 282; 524/101

[56] References Cited

U.S. PATENT DOCUMENTS

| | | | |
|---|---|---|---|
| 2,891,279 | 6/1959 | Neumann | 156/282 |
| 3,765,999 | 10/1973 | Toyoda | 156/229 X |
| 3,799,828 | 3/1974 | Takashi et al. | 156/229 |
| 4,091,165 | 5/1978 | Hayama | 428/409 |
| 4,234,664 | 11/1980 | Hendy | 428/516 X |
| 4,242,418 | 12/1980 | Kitagawa | 428/516 X |
| 4,341,880 | 7/1982 | Toyoda et al. | 524/101 |
| 4,365,002 | 12/1982 | Takahashi et al. | 428/516 X |

OTHER PUBLICATIONS

English Translation: Japanese Pat. No. 34568/1981, Kaisha, Jun. 2, 1982.

*Primary Examiner*—Thomas J. Herbert, Jr.
*Attorney, Agent, or Firm*—Wenderoth, Lind & Ponack

[57] ABSTRACT

A water-soluble coating composition adapted for imparting appropriate printing, especially off-set printing, and processing characteristics to a thermoplastic resin film to be used as a synthetic paper and a coated film prepared with the composition are provided. The coating composition comprises (A) 100 parts by weight of a water-soluble polymer containing tertiary or quaternary nitrogen, (B) 5 to 75 parts by weight of a water-soluble polyaminepolyamideepichlorohydrin adduct, and (C) 5 to 100 parts by weight of a water-soluble polyimine compound.

7 Claims, No Drawings

COATING AGENTS AND THERMOPLASTIC RESIN FILMS COATED THEREWITH

BACKGROUND OF THE INVENTION

This invention relates to a coating agent for a synthetic paper and a synthetic paper coated therewith.

Opaque or translucent films composed of a single layer of an inorganic fine powder-incorporated polyolefin or a laminate having at least one surface thereof such a powder-incorporated polyolefin layer, and especially such films in which the polyolefin layer has been oriented at least monoaxially are useful as synthetic papers.

Such synthetic papers, however, do not always have a satisfactory printability and an anti-staticity because the resin component used is a polyolefin. Accordingly, such synthetic papers are normally subjected to a suitable surface treatment. One of such surface treatments is to apply a coating agent on the surface of the synthetic paper.

A known example of such a coating agent is one containing a water-soluble antistatic polymer (e.g., Japanese Patent Laid-open Pub. No. 10624/75). This prior art coating agent is excellent in improving the adhesion of an ink and in overcoming the agglutination of dust due to static electrification or electrostatic charging. This coating agent is usually excessively water-soluble, however, and the resulting synthetic paper fails to give a satisfactory water-resistant adhesion of ink thereon and a satisfactory transfer of ink in off-set printing. Moreover there occur staining of printing plates and blurring of aqueous ink. Thus, such surface-treated synthetic paper has heretofore often lacked properties required for off-set printing paper. Such deficiencies are serious in view of the advantages of off-set printing.

In this connection, poor transfer of ink upon off-set printing occurs in multicolor continuous off-set printing and also in both-surface printing. The former case concerns the phenomenon of a nonuniform transfer of an ink in the second and succeeding color printings on a multicolor printing machine due to the influence of dampening water transferred onto the paper, which occurs as a result of strong retention of dampening water due to the strong affinity between the surface coating agent and water. The latter unevenness of ink transfer in the both-surface printing is due to a phenomenon of uneven transfer of an ink corresponding to the configuration of surface-printed images, which appears in the printing of the back surface of top surface-printed paper and occurs because the dampening water transferred onto the paper in the top surface printing undergoes migration to the back surface of the paper.

Off-set printing ingeniously utilizes the difference in affinity with printing plates between the water (dampening water) and an ink. The influence of the amount of the water is delicate and significant, as clearly shown by the fact that uneven transfer of ink takes place as a consequence of a small change in the amount of water.

The blurring of an aqueous ink occurs because the images stamped or written by a stamp ink, an aqueous ink pen, an aqueous ball-point pen, a recorder ink and the like take a long time before being completely dried. More specifically, the blurring is due to a phenomenon wherein the surface coating agent is dissolved by the water contained in the ink during the drying, and the water acts on the pigment in the ink to cause blurring of the ink, whereby the images written or stamped spread or become inflated until they are dried, sometimes to a degree such that the images become indistinguishable.

As one of the most successful synthetic papers, there has been a composite film having on the surface thereof a polyolefin film paper-like layer containing fine inorganic powder (e.g. clay and calcium carbonate). A paper of this character in which the surface layer has been stretched monoaxially and surface cracks exist at the sites of the inorganic fine powder particles has especially excellent properties in respect of off-set printability. It can be easily understood that the water-retention property on the surface of such a synthetic paper is affected by the water-retention or hydrophilic nature of the inorganic fine powder particles used. In this connection, clay has large water retention and calcium carbonate has small water retention. Therefore, it may be said that this synthetic paper having on the surface thereof a polyolefin film layer containing calcium carbonate has lower ability to absorb and retain the water content in an ink and dampening water transferred upon printing, and, as a consequence, uneven transfer of ink, blurring of an aqueous ink and the like are apt to take place more readily in comparison with a similar synthetic paper having a clay-containing layer.

SUMMARY OF THE INVENTION

It is an object of the present invention to solve the above-described problems by the use of a coating agent composed of a crosslinkable water-soluble resin composition.

The water-soluble coating composition of the present invention is characterized by a resin composition comprising the following components (A), (B) and (C):
(A) a water-soluble tertiary or quaternary nitrogen-containing polymer: 100 parts by wt.
(B) a water-soluble polyamine polyamide-epichlorohydrin adduct: 5 to 75 parts by wt.
(C) a water-soluble polyimine compound selected from the group consisting of polyethyleneimine, poly(ethyleneimine-urea), and an ethyleneimine adduct of polyaminepolyamide: 5 to 100 parts by wt.

Furthermore the film having excellent printability of the present invention is characterized by a coated film comprising a surface layer of a polyolefin film containing a fine inorganic powder and a coating layer formed on the surface layer, said coating layer having been formed by applying as a coating on the surface film layer an aqueous solution of a resin composition comprising the following components (A), (B) and (C) and drying the coating solution, said coating layer containing 0.005 to 1 g/m$^2$ of the solid content:
(A) a water-soluble tertiary or quaternary nitrogen-containing polymer: 100 parts by wt.
(B) a water-soluble polyaminepolyamide-epichlorohydrin adduct: 5 to 75 parts by wt.
(C) a water-soluble polyimine compound selected from the group consisting of polyethyleneimine, poly(ethyleneimine-urea), and an ethyleneimine adduct of polyaminepolyamide: 5 to 100 parts by wt.

By the use of a water-soluble crosslinkable resin composition comprising specified plural components in accordance with the present invention, various problems encountered relative to the above-described prior-art coating agents can be eliminated. More specifically, the trouble accompanying the supplying and taking off of the printing paper due to static electricity has been effectively prevented by the use of a polymeric antistatic agent [Component (A)] especially suitable for a specific synthetic paper. The difficulties arising from excessive water solubility such as poor transfer of ink, staining of printing plates and water-resistant adhesion of ink have been effectively overcome by the crosslinkage between the Component (B) and the Component (C).

DETAILED DESCRIPTION OF THE INVENTION

1. Coating Agent

The coating agent according to the present invention is a water-soluble composition comprising the aforenamed Components (A), (B) and (C).

(1) Antistatic agent [Compound (A)]

The antistatic agent to be used in the present invention is a water-soluble tertiary or quaternary nitrogen-containing polymer. The term "quaternary" used herein is to be understood as encompassing the term "ampholytic."

Such nitrogen-containing polymers can be prepared by polymerizing the corresponding nitrogen-containing monomer and, if desired, by quaternizing the resulting tertiary nitrogen-containing polymer.

Typical examples of such nitrogen-containing monomers suitable for use in the present invention are as follows.

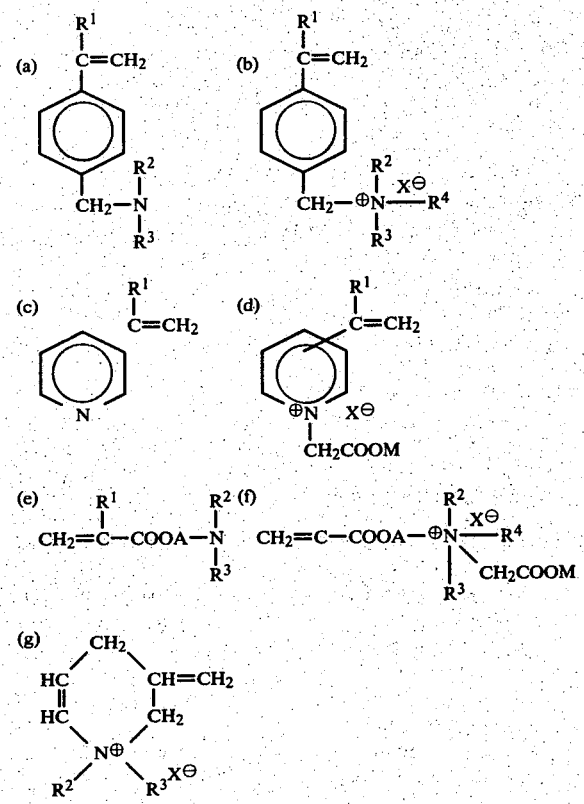

In the above formulas: $R^1$ stands for hydrogen or methyl group; each of $R^2$ and $R^3$ stands for a lower alkyl group (especially one having 1 to 4 carbon atoms, preferably 1 or 2 carbon atoms); $R^4$ stands for a saturated or unsaturated alkyl group or cycloalkyl group having 1 to 22 carbon atoms; $X^{\ominus}$ stands for a counter anion of a quaternized $N^{\oplus}$ (e.g., halide (especially chloride) ions); M stands for an alkali metal ion (especially sodium, potassium or lithium); and A stands for an alkylene group having 2 to 6 carbon atoms. The quaternary nitrogen-containing monomers (b), (d) and (f) can, of course, also be incorporated into the polymer by polymerizing their precursor monomers ((a), (c) and (e)) and then quaternizing the resulting polymer with a cationizing agent such as an alkyl halide, dimethyl sulphate, or a monochloroacetic acid ester.

The antistatic agent to be used in the present invention must be water-soluble, but it is not desired that it is excessively water-soluble. Thus, it is desirable that the tertiary or quaternary nitrogen-containing polymer is a copolymer with a hydrophobic monomer. Suitable hydrophobic monomers are, for example, styrene, a nucleus- or side chain-substituted styrene, an acrylate or methacrylate, a vinyl halide, and the like.

The antistatic agent polymer especially suitable for use in the present invention is a copolymer obtained by copolymerizing the following components (i), (ii) and (iii):

| | |
|---|---|
| (i) a monomer selected from (a) through (g) above | 20 to 40% by wt., |
| (ii) $\begin{array}{c}R^1\\|\\CH_2=C-COOR^5\end{array}$ | 6 to 80% by wt., |
| (iii) another hydrophobic vinyl monomer | 0 to 20% by wt. |

The antistatic agent polymer which is most suitable for use in the present invention is a polymer wherein the monomer (i) is the above-mentioned monomer (f) wherein the $X^{\ominus}$ is $Cl^{\ominus}$.

(2) Polyaminepolyamide-epichlorohydrin adduct [Component (B)]

The Component (B) is a water-soluble cationic thermosetting resin obtained by the reaction of a polyamide produced from a saturated dibasic carboxylic acid having 3 to 10 carbon atoms and a polyalkylenepolyamine with epichlorohydrin.

This resin is described in detail in Japanese Patent Publication No. 3547/60. The saturated dibasic carboxylic acid having 3 to 10 carbon atoms is exemplified by a dicarboxylic acid having 4 to 8 carbon atoms, especially adipic acid. The polyalkylenepolyamine is exemplified by a polyethylenepolyamine, especially by ethylenediamine, diethylenetriamine and triethylenetetramine (preferably by diethylenetriamine). In the reaction for producing the polyamide, the molar ratio of the polyalkylenepolyamine to the dibasic acid is generally from about 0.9:1 to about 1.2:1. In the reaction of the polyaminepolyamide with epichlorohydrin, about 0.5 to about 1.8 mols of epichlorohydrin is normally used for each secondary amine group in the polyamide.

(3) Polyimine compound [Component (C)]

The Component (C) is selected from polyethyleneimine, copolymer of ethyleneimine and urea [poly(ethyleneimine-urea)], and ethyleneimine adducts of polyaminepolyamide (wherein the suitable range of the polyamide is as exemplified above as the Component (B)). These materials should be water-soluble.

The degree of polymerization of these materials, the content of urea units in the case of a poly(ethyleneimine-urea), and the quantity of adduct in the case of the ethyleneimine adduct of polyaminepolyamide can be optionally determined as long as the meritorious effects of the present invention are achieved.

(4) Optional components [Component (D)]

The coating agent of the present invention comprises the above-mentioned components (A), (B) and (C) as the essential components. The composition can further contain other optional components as long as the composition comprises the components (A), (B) and (C) and the meritorious effects of the present invention are achieved.

Such an optional component is exemplified by a water-soluble inorganic salt. When the present coating agent contains such an inorganic salt, the antistatic effect of the above-mentioned antistatic agent is enhanced and also the drying speed of an off-set ink printed thereon is increased. The presence of the water-soluble inorganic salt, however, lowers the water-resistant adhesiveness of the ink. The presence of an excessively larger amount of the salt is not desirable.

Examples of preferred water-soluble inorganic salts are alkaline salts such as sodium carbonate, potassium carbonate, sodium hydrogen carbonate and sodium sulfite, as well as neutral salts such as sodium chloride, sodium sulfate and sodium nitrate.

Besides such water-soluble inorganic salts, the present coating composition can contain a water-soluble organic solvent, a surface-active agent, a water-soluble polymer, fine powder materials and other auxiliary materials.

(5) Quantity ratio between components

The ratios between the essential Components (A), (B) and (C) and the optional Components (D) are as follows.

| Components | Parts by weight |
|---|---|
| (A) | 100 |
| (B) | 5 to 75, preferably 10 to 50 |
| (C) | 5 to 100, preferably 10 to 50 |
| (D) | 0 to 75, preferably 0 to 40. |

The optional Component (D), when used, is preferably present in a quantity of at least 5 parts by weight and especially 10 to 40 parts by weight to 100 parts by weight of the Component (A).

(6) State of the coating agent

The coating agent composed of a water-soluble resin composition comprising the Components (A), (B) and (C) (and if desired the Component (D)) is normally in the form of an aqueous solution. The concentration of the aqueous solution is generally about 0.5 to about 3% by weight.

2. Synthetic Paper

The synthetic paper on which the above-described coating agent is to be applied as a coating is composed of a composite film which has a surface layer of a polyolefin film containing a fine inorganic powder.

Such a synthetic paper has been known. For the details thereof, reference can be made to, for example, Japanese Patent Publication No. 40794/71 (corresponding to U.S. Pat. No. 3,799,828, and U.K. Pat. No. 1,268,823) and No. 1782/74, and the specifications of Japanese Patent Application No. 23265/80, No. 87516/80 and No. 130775/80.

One group of such film having a surface layer of a polyolefin film containing a fine inorganic powder (hereinafter referred to as a paper-like layer) is of a single layer structure consisting of such a polyolefin film layer. Another group of such film is of a laminated structure having as one surface layer and preferably both surface layers thereof such paper-like layer(s). Because exhibition of paper-like properties and exhibition of paper strengths are generally based on different factors, it is advantageous that these factors be contributed by different layers. Thus, in this respect, a laminated structure is advantageous.

It is desirable that the paper-like layer have a biaxial orientation or, preferably, be in a monoaxially stretched state. Furthermore, it is preferred that the paper-like layer have therein 5 cracks/mm$^2$ or more of surface cracks of widths of 0.1 to 10 microns and lengths of 0.3 to 30 microns. Such surface cracks can be produced by orienting and preferably stretching monoaxially a polyolefin film containing a fine inorganic powder.

The fine inorganic powder preferably has a particle size of about 0.1 to about 10 microns and is mixed in an amount of 10 to 200 parts by weight with 100 parts by weight of polyolefin.

The type of the fine inorganic powder can be selected optionally from a variety of such powders, such as clay, calcium carbonate, talc, silica and titania. As described above, the maximum effect of the present invention is achieved when an inorganic powder having less water retention such as calcium carbonate is used.

Such synthetic paper can be produced by melt-extrusion of a composition for the paper-like layer (if desired followed by orientation) in the case of the paper of a single-layer structure. The synthetic paper of a laminated structure can be produced by melt-extruding and laminating a composition for the paper-like layer onto one or both surfaces of an unoriented or oriented (especially in the machine direction) thermoplastic resin film (which may be a laminated film) in the absence or presence of a thermoplastic resin layer interposed therebetween, this step being preferably followed by stretching of the laminated product in the cross-machine direction. The "polyolefin" of the paper-like layer is represented by polyethylene, polypropylene and a resinous poly(ethylene-propylene) copolymer as well as their reaction products with maleic anhydride. The "thermoplastic resin" of the supporting or substrate layer is exemplified by a polyolefin which may be the same as or different from that of the paper-like layer. The synthetic paper can be subjected to a corona discharge treatment or other surface treatment prior to application of the coating composition.

3. Coating

The coating agent can be applied onto the synthetic paper by rolling, brushing, spraying, soaking or any other suitable method.

4. Experimental Examples

EXAMPLE 1

(1) Polypropylene having a melt index (M.I.) of 0.8 was mixed with 12% by weight of calcium carbonate of an average particle size of 1.5 microns (% being on the basis of the total weight of the resulting mixture herein and in the following description). The mixture was kneaded by an extruder at 270° C., extruded into a sheet and then cooled by a cooling apparatus to obtain an unoriented sheet. The sheet was heated to 140° C. and then stretched 5 times the original length in the machine direction.

(2) A Composition (A) (containing 0.05 part by weight of a modifying monomer per 100 parts by weight of filler material) was prepared by mixing 49% by weight of polypropylene having a melt index of 4.0, 5% by weight of maleic acid (modifying monomer)-modified polypropylene having a maleic acid content of 0.5% by weight and 46% by weight of calcium carbonate of an average particle size of 1.5 microns. A Composition (B) was prepared by mixing 55% by weight of polypropylene having a melt index of 4.0 and 45% by weight of calcium carbonate of an average particle size of 1.5 microns. The Composition (A) melt-kneaded by an extruder at 270° C. and the Composition (B) melt-kneaded by another extruder at 270° C. were laminated in a die and coextruded onto the both surfaces of the oriented (5 times in the machine direction) sheet obtained in the step (1) above in such a way that the layer containing the modified-polypropylene layers came out on the outer sides. The resulting 5-ply laminate was heated to 155° C. and then stretched 7.5 times in the cross-machine direction to obtain a 5-ply film.

(3) Both surfaces of the 5-ply film were subjected to a corona discharge treatment and then coated with the following aqueous coating solution in a quantity of 0.05 g/m² of the solid content per surface. The coated film was dried and rolled up.

The composition of the aqueous coating solution was as follows.

(a) water-soluble polyacrylic antistatic agent polymer (ST-1100*) manufactured by Mitsubishi Petrochemical Co., Ltd.: 100 parts by wt.

(b) epichlorohydrin adduct of water-soluble polyaminepolyamide (Kymene 557H) manufactured by DIC Hercules K.K.: 25 parts by wt.

(c) ethyleneimine adduct of polyaminepolyamide (Polymin SN) manufactured by BASF A.G.: 25 parts by wt.

(d) sodium carbonate having an average particle size of 1.2 microns: 12 parts by wt.

(note*) containing in the molecular chain

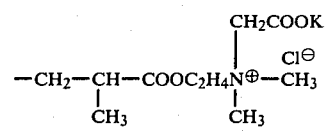

The properties of the film thus obtained are shown below. This film was excellent as a film for lithographic off-set printing.

(i) Thickness = 130 microns,
(ii) Opaqueness = 96%,
(iii) Whiteness = 95%,
(iv) Gloss = 15%,
(v) Off-set printability: No unsound condition whatsoever was observed in continuous multicolor printing with 4 colors each on the both surfaces of 10,000 sheets with respect to transfer of ink, adhesion of ink, wet trapping of ink, water-resistant adhesion of ink, unevenness of ink transfer in printing a back surface, drying of ink and the like.

EXAMPLE 2

Both surfaces of samples of the film obtained in step (2) of Example 1 were subjected to a corona discharge treatment and then coated with aqueous solutions respectively of coating compositions shown in the following Table 1 each in an amount of 0.03 g/m² of the solid content per surface. The coated films were dried and rolled up. The properties of the resulting films are shown in Table 1. With respect to antistatic properties, adhesion strength of an ink, water-resistant adhesion strength of an ink, ink-transfer property in multicolor continuous printing, blurring of aqueous ink, staining of printing plate and the like, the films of run Nos. 2-C, D, I, J, N, O, P and Q had excellent properties as a substrate film for off-set printing; the films of run Nos. 2-B, E, F and M were substantially at the acceptable limit for practical use; and the films of run Nos. 2-A, G, H, K and L were not practicable.

The symbols used for evaluation in the following tables are as follows.

O = good, Δ = fair, X = bad.

TABLE 1

| Run Nos. | Components | | | | Results of Evaluation | | | | | | |
|---|---|---|---|---|---|---|---|---|---|---|---|
| | Component A | Component B | Component C (polyimin SN) | Component D (sodium carbonate) | Antistatic property (surface resistivity) 23° C. 50% RH, Ω | Adhesion strength of ink | Water resistant adhesion strength of ink | Transfer of ink (multicolor printing machine) | Blurring of aqueous ink | Staining of printing plate | Paper supply-discharge characteristic |
| 2-A | 100 | 0 | 25 | 12 | $3 \times 10^9$ | O | O | X | X | X | O |
| 2-B | 100 | 5 | 25 | 12 | $3 \times 19^9$ | O | O | Δ | Δ | Δ | O |
| 2-C | 100 | 10 | 25 | 12 | $4 \times 10^9$ | O | O | O | O | O | O |
| 2-D | 100 | 50 | 25 | 12 | $4 \times 10^9$ | O | O | O | O | O | O |
| 2-E | 100 | 75 | 25 | 12 | $3 \times 10^{12}$ | O | O | O | O | O | Δ |
| 2-F | 100 | 100 | 25 | 12 | $3 \times 10^{13}$ | O | O | O | O | O | X |
| 2-G | 100 | 25 | 0 | 12 | $3 \times 10^9$ | X | X | O | O | O | O |
| 2-H | 100 | 25 | 5 | 12 | $4 \times 10^9$ | Δ | Δ | O | O | O | O |
| 2-I | 100 | 25 | 10 | 12 | $3 \times 10^9$ | O | O | O | O | O | O |
| 2-J | 100 | 25 | 50 | 12 | $3 \times 10^9$ | O | O | O | O | O | O |
| 2-K | 100 | 25 | 100 | 12 | $3 \times 10^9$ | O | O | O | O | X | O |
| 2-L | 100 | 25 | 25 | 0 | $5 \times 10^{14}$ | O | O | O | O | O | X |
| 2-M | 100 | 25 | 25 | 3 | $4 \times 10^{13}$ | O | O | O | O | O | X |
| 2-N | 100 | 25 | 25 | 5 | $3 \times 10^{11}$ | O | O | O | O | O | O |
| 2-O | 100 | 25 | 25 | 25 | $3 \times 10^9$ | O | O | O | O | O | O |
| 2-P | 100 | 25 | 25 | 50 | $1 \times 10^9$ | O | O | O | O | O | O |
| 2-Q | 100 | 25 | 25 | 75 | $1 \times 10^9$ | O | O | O | O | O | O |

EXAMPLE 3

Both surfaces of 8 samples of the film obtained in step (2) of Example 1 were subjected to a corona discharge treatment and then coated with an aqueous solution of the following composition respectively in quantities of 0.002, 0.005, 0.01, 0.05, 0.1, 0.5, 1 and 2 g/m² of the solid content per surface. The coated films were dried and rolled up. The composition of the aqueous solution was as follows.
- (a) water-soluble polyacrylic antistatic agent polymer (ST-1100) manufactured by Mitsubishi Petrochemical Co., Ltd.: 100 parts by wt.
- (b) water-soluble polyamide-epichlorohydrin resin (Kymene 557H) manufactured by DIC Hercules K.K.: 20 parts by wt.
- (c) polyaminepolyamide-ethyleneimine adduct (Polymin SN) manufactured by BASF A.G.: 20 parts by wt.
- (d) sodium carbonate: 10 parts by wt.

The properties of the resultiung films were as shown in Table 2. The films of run Nos. 3-C, D, E and F had excellent properties as a substrate film for off-set printing. The films of run Nos. 3-B and G were practically usable. The films of run Nos. 3-A and H were not practicable.

TABLE 2

| Run Nos. | Quantity of surface coating (solid content) (g/m² per surface) | Antistatic property (23° C., 50% RH) ω | Adhesion strength of ink | Water-resistant adhesion strength of ink | Transfer of ink (multi-color printing machine) | Blurring of aqueous ink | Staining of printing plate | Paper supply-discharge characteristic |
|---|---|---|---|---|---|---|---|---|
| 3-A | 0.002 | $5 \times 10^{14}$ | Δ | Δ | O | O | O | X |
| 3-B | 0.005 | $3 \times 10^{12}$ | Δ | Δ | O | O | O | Δ |
| 3-C | 0.01 | $1 \times 10^{10}$ | O | O | O | O | O | O |
| 3-D | 0.05 | $3 \times 10^{9}$ | O | O | O | O | O | O |
| 3-E | 0.1 | $2 \times 10^{9}$ | O | O | O | O | O | O |
| 3-F | 0.5 | $2 \times 10^{9}$ | O | O | O | O | O | O |
| 3-G | 1 | $1 \times 10^{9}$ | O | Δ | Δ | O | Δ | O |
| 3-H | 2 | $7 \times 10^{8}$ | O | X | X | O | X | O |

EXAMPLE 4

(1) Polypropylene having a melt index of 0.8 was mixed with 15% by weight of baked clay of an average particle size of 1.5 microns and additives necessary for processing. The mixture was kneaded in an extruder at 270° C., extruded into a sheet, and then cooled by a cooling apparatus to obtain an unoriented sheet. The sheet was heated to 140° C. and then stretched 4 times the original length in the machine direction.

(2) A composition was prepared by mixing 55% by weight of polypropylene having a melt index of 4.0, 45% by weight of baked clay of an average particle size of 1.5 microns and an anti-oxidant. The composition was melt-kneaded by an extruder at 280° C., laminated in a molten state onto both surfaces of the M.D. stretched sheet obtained in step (1) above, and immediately cooled by a roller to obtain a 3-ply laminate. The resulting laminated sheet was heated to 150° C. and then stretched 7 times in the cross-machine direction to obtain a 3-ply film.

(3) Both surfaces of the 3-ply laminated film was subjected to a corona discharge treatment, and then coated with an aqueous solution (1% by weight of total solid content) of the following composition in a quantity of 0.05 g/m² of the solid content per surface. The coated film was dried and rolled up. The composition of the aqueous solution was used as follows.
- (a) water-soluble antistatic agent polymer (ST-1100): 100 parts by wt.
- (b) epichlorohydrin adduct of water-soluble polyaminepolyamide (Kymene 557H): 25 parts by wt.
- (c) ethyleneimine adduct of polyaminepolyamide (Polymin SN) manufactured by BASF A.G.: 25 parts by wt.
- (d) sodium carbonate: 12 parts by wt.

As a comparative example, an aqueous coating solution (1% by weight of solid content) not containing component (b) above was prepared and applied onto the laminated film in the same quantity as in the Example. The film was then dried and rolled up.

The resulting films had the following properties. The film of the present invention was excellent in the off-set printing property compared with that of the comparative example.

|  | Example 4 | Comparative Example |
|---|---|---|
| Antistatic property | $4 \times 10^{9} \omega$ | $4 \times 10^{9} \omega$ |
| Adhesion strength of ink | O | O |
| Water-resistant adhesion of ink | O | O |
| Transfer of ink | O | Δ |
| Blurring of aqueous ink | O | O |
| Staining of printing plate | O | X |

EXAMPLE 5

(1) Polypropylene having a melt index of 0.8 was mixed with 15% by weight of calcium carbonate of an average particle size of 1.5 microns and an anti-oxidant. The mixture was kneaded in an extruder at 270° C., extruded into sheeting and then cooled by a cooling apparatus to obtain an unoriented sheet. The sheet was heated to 140° C. and then stretched 4 times the original length in the machine direction.

(2) A composition was prepared by mixing 55% by weight of polypropylene having a melt index of 4.0, 45% by weight of calcium carbonate of an average particle size of 1.5 microns and additives necessary for processing. The composition was melt-kneaded in an extruder at 280° C., laminated in a molten state onto both surfaces of the M.D. stretched sheet obtained in step (1) above and immediately cooled by a roller to obtain a 3-ply laminate. The resulting laminated sheet was heated to 150° C. and then stretched 7 times in the cross-machine direction to obtain a 3-ply film.

(3) Both surfaces of the 3-ply laminated film was subjected to a corona discharge treatment and then coated with an aqueous solution (1% by weight of total solid content) of the following composition in a quantity of 0.1 g/m² of the solid content per surface. The coated film was dried and rolled up. The composition of the aqueous solution used was as follows.

(a) water-soluble antistatic agent polymer (ST-1100): 100 parts by wt.
(b) water-soluble polyamide-epichlorohydrin resin (AF-100) manufactured by Arakawa Kagakukogyo K.K.: 20 parts by wt.
(c) ethyleneimine adduct of polyaminepolyamide (Polymin SN) manufactured by BASF A.G.: 20 parts by wt.
(d) a salt selected from sodium carbonate, sodium hydroxide and sodium sulfite: 10 parts by wt.

The film thus obtained was excellent as a substrate for off-set printing with respect to antistatic property, adhesion strength of ink, water-resistant adhesion strength of ink, ink-transfer property in multicolor continuous printing, ink-transfer unevenness in back surface upon printing on both surfaces and the like properties.

EXAMPLE 6

(1) Polypropylene having a melt index of 0.8 was mixed with 15% by weight of calcium carbonate of an average particle size of 15 microns and an anti-oxidant. The mixture was kneaded in an extruder at 270° C., extruded into a sheet and then cooled by a cooling apparatus to obtain an unoriented sheet. The sheet was heated to 140° C. and then stretched 4 times the original length in the machine direction.

(2) A composition was prepared by mixing 55% by weight of polypropylene having a melt index of 4.0, 45% by weight of calcium carbonate of an average particle size of 1.5 microns and additives necessary for processing. The composition was melt-kneaded in an extruder at 280° C., laminated in a molten state onto both surfaces of the M.D. stretched sheet obtained in step (1) above, and immediately cooled by a roller to obtain a 3-ply laminate. The resulting laminated sheet was heated to 150° C. and then stretched 7 times in the cross-machine direction to obtain a 3-ply film.

(3) Both surfaces of the 3-ply laminated film was subjected to a corona discharge treatment and then coated with an aqueous solution of the following composition in a quantity of 0.08 g/m² of the solid content. The coated film was dried and rolled up. The composition of the aqueous solution used was as follows.

(a) water-soluble antistatic agent polymer (ST1100): 100 parts by wt.
(b) water-soluble polyamide-epichlorohydrin resin (Kymene 557H) manufactured by DIC Hercules K.K.: 20 parts by wt.
(c) high-molecular polyethyleneimine (Polymin P) manufactured by BASF A.G.: 20 parts by wt.
(d) sodium carbonate: 10 parts by wt.

With respect to antistatic property, adhesion property of ink, transfer property of ink, blurring of aqueous ink and like properties, the resulting film was excellent as a substrate for off-set printing.

EXAMPLE 7

(A) (1) Polypropylene having a melt index of 0.8 was mixed with 12% by weight (based on the total weight with the polypropylene) of calcium carbonate of an average particle size of 1.5 microns. The mixture was kneaded in an extruder at 270° C., extruded into a sheet and then cooled by a cooling apparatus to obtain an unoriented sheet. The sheet was heated to 140° C. and then stretched 5 times the original length in the machine direction.

(2) A composition (a) (containing 0.06 part by weight of a modifying monomer per 100 parts by weight of filler materials) was prepared by mixing 55% by weight of polypropylene having a melt index of 4.0, 5% by weight of maleic acid-modified polypropylene having a maleic acid content of 0.5% by weight, and 40% by weight of calcium carbonate of an average particle size of 1.5 microns. A composition (b) was prepared by mixing 60% by weight of polypropylene having a melt index of 4.0 and 40% by weight of calcium carbonate of an average particle size of 1.5 microns. The composition (a) melt-kneaded in an extruder at 270° C. and the composition (b) melt-kneaded in another extruder at 270° C. were laminated in a die and coextruded onto both surfaces of the oriented (5 times in the machine direction) sheet obtained in the step (1) above in such a way that the layers containing the modified-polypropylene came out on the outer sides. The resulting 5-ply laminate was heated to 155° C. and then stretched 7 times in the cross-machine direction to obtain a 5-ply film.

(B) (1) Polypropylene having a melt index of 0.8 was mixed with 12% by weight of baked clay of an average particle size of 1.5 microns (based on the total weight with the polypropylene). The mixture was kneaded in an extruder at 270° C., extruded into a sheet and then cooled by a cooling apparatus to obtain an unoriented sheet. The sheet was heated to 140° C. and then stretched 5 times the original length in the machine direction.

(2) A composition (a) (containing 0.06 part by weight of a modifying monomer per 100 parts by weight of filler materials) was prepared by mixing 55% by weight of polypropylene having a melt index of 4.0, 5% by weight of a maleic acid-modified polypropylene having a maleic acid content of 0.5% by weight, and 40% by weight of baked clay of an average particle size of 1.5 microns. A composition (b) was prepared by mixing 60% by weight of polypropylene having a melt index of 4.0 and 40% by weight of baked clay of an average particle size of 1.5 microns. The composition (a) melt-kneaded in an extruder at 270° C. and the composition (b) melt-kneaded in another extruder at 270° C. were laminated in a die and coextruded onto both surfaces of the oriented (5 times in the machine direction) sheet obtained in the step (1) above in such a way that the layers containing the modified-polypropylene came out on the outer sides. The resulting 5-ply laminate was heated to 155° C. and then stretched 7 times in the cross-machine direction to obtain a 5-ply film.

(C) Both surfaces of the 5-ply laminated films obtained in the processes (A) and (B) above were subjected to a corona discharge treatment, and then separate samples of each of these films were coated respectively with aqueous solutions of the following coating compositions each in a quantity of 0.05 g/m² of solid content per surface. The coated films were dried and rolled up. The coating compositions were as follows.

(Coating composition-1)

(a) water-soluble antistatic agent polymer (ST-1100) manufactured by Mitsubishi Petrochemical Co., Ltd.: 100 parts by wt.
(b) epichlorohydrin adduct of water-soluble polyaminepolyamide (AF-100) manufactured by Arakawa Kagakukogyo K.K.: 25 parts by wt.
(c) ethyleneimide adduct of polyaminepolyamide (Polymin SN) manufactured by BASF A.G.: 25 parts by wt.
(d) sodium carbonate: 10 parts by wt.

(Coating composition-2)

(a) water-soluble antistatic agent polymer (ST-1100) manufactured by Mitsubishi Petrochemical Co., Ltd.: 100 parts by wt.
(b) ethyleneimine adduct of polyaminepolyamide (Polymin SN) manufactured by BASF A.G.: 25 parts by wt.
(c) sodium carbonate: 10 parts by wt.

The properties of the films thus obtained are shown in the following table. It is noted that the film (A) coated with the coating composition-2 was inferior with respect to blurring of an off-set printing ink to the other coated films.

| Films | Coating composition | Transfer of ink in continuous multicolor printing | Adhesion of ink | Unevenness of ink transfer in two-surface printing | Blurring of aqueous ink | Antistatic property |
|---|---|---|---|---|---|---|
| (A) | Composition-1 | O | O | O | O | O |
|  | Composition-2 | X | O | X | X | O |
| (B) | Composition-1 | O | O | O | O | O |
|  | Composition-2 | X | O | Δ | Δ | O |

What is claimed is:

1. A coated film having excellent printability which comprises a base film having a surface layer of a polyolefin film containing an inorganic fine powder, said film having on the surface thereof 5 cracks/mm$^2$ or more and which cracks are 0.1 to 10 microns in width and 0.3 to 30 microns in length and a coating layer formed on the surface film layer, said coating layer having been formed by coating the surface film layer with an aqueous solution of a resin composition and drying the coating solution, said coating layer containing 0.005 to 1 g/m$^2$ of the solid content of said aqueous solution, said resin composition comprising:
    (A) 100 parts by weight of a water-soluble polymer containing tertiary or quarternary nitrogen;
    (B) 5 to 75 parts by weight of a water-soluble polyaminepolyamide-epichlorohydrin adduct; and
    (C) 5 to 100 parts by weight of a water-soluble polyimine compound selected from the group consisting of polyethyleneimine, poly(ethyleneimine-urea) and ethyleneimine adducts of polyaminepolyamide.

2. The coated film according to claim 1, in which the polyolefin film layer containing the fine inorganic powder has been oriented.

3. The coated film according to claim 1, in which said base film is a film of at least 3-ply laminated structure having the polyethylene film layers containing the fine inorganic powder as both outer surface layers of the film, and the polyolefin film layers have been stretched monoaxially.

4. The coated film according to claim 1, in which the fine inorganic powder is calcium carbonate of a particle size of 0.1 to 10 microns, and the content thereof in said polyolefin layer is 10 to 200 parts by weight for 100 parts by weight of the polyolefin.

5. The coated film according to claim 1, in which said resin composition forming the coating layer further comprises (D) 5 to 40 parts by weight of a water-soluble inorganic salt.

6. The coated film according to claim 1 in which the component (A) is an ampholytic polymer obtained by quaternizing with a cationizing agent a tertiary nitrogen atom in a copolymer of:
    (a) 20 to 40% by weight of a component represented by the formula

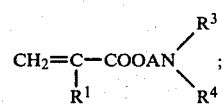

(b) 6 to 80% by weight of a component represented by the formula

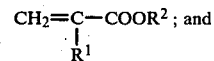

(c) 0 to 20% by weight of another hydrophobic vinyl monomer,
wherein, R$^1$ stands for H or CH$_3$, R$^2$ stands for an alkyl group having 1 to 18 carbon atoms, R$^3$ and R$^4$ stand for H or an alkyl group having 1 or 2 carbon atoms, respectively, and A stands for an alkylene group having 2 to 6 carbon atoms.

7. The coated film according to claim 1, in which the component (B) is an epichlorohydrin adduct of a polyamide composed of adipic acid and diethylenetriamine.

* * * * *